United States Patent
Zeron Hernandez (10) Patent No.: US 11,084,372 B1
(45) Date of Patent: Aug. 10, 2021

(54) SPRING LOADED NUT POCKET

(71) Applicant: DENSO International America, Inc., Southfield, MI (US)

(72) Inventor: Mario Zeron Hernandez, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/820,011

(22) Filed: Mar. 16, 2020

(51) Int. Cl.
 *B60K 1/04* (2019.01)
 *B60K 11/04* (2006.01)

(52) U.S. Cl.
 CPC .................................. *B60K 11/04* (2013.01)

(58) Field of Classification Search
 CPC ......... F16B 27/00; F16B 39/284; F16B 39/36
 See application file for complete search history.

(56) References Cited

U.S. PATENT DOCUMENTS

| | | | | |
|---|---|---|---|---|
| 1,800,176 A * | 4/1931 | Carr | ...................... | F16B 37/044 411/15 |
| 2,649,126 A * | 8/1953 | Tinnerman | ........... | B60Q 1/0683 411/113 |
| 3,035,624 A * | 5/1962 | Jaworski | ............... | F16B 37/044 411/112 |
| 3,060,988 A * | 10/1962 | Munse | .................. | F16B 37/041 411/103 |
| 4,493,597 A * | 1/1985 | Rolf | ........................ | F16B 39/10 411/193 |
| 5,178,920 A * | 1/1993 | Stone | .................... | B60R 13/005 280/727 |
| 5,183,286 A * | 2/1993 | Ayabe | ..................... | B60G 7/02 280/124.1 |
| 10,167,768 B2 | 1/2019 | Wright et al. | | |
| 2013/0206774 A1 | 8/2013 | Menchel et al. | | |

* cited by examiner

*Primary Examiner* — John D Walters
*Assistant Examiner* — James J Triggs
(74) *Attorney, Agent, or Firm* — Harness, Dickey & Pierce, P.L.C.

(57) ABSTRACT

An attachment tab configured to house a nut includes a housing, a first beam, and a second beam. The housing defines a cavity for receiving the nut. The first beam is attached to a first inside surface of said housing by a first biasing member. The second beam is attached to a second inside surface of the housing by a second biasing member. The second inside surface is opposite the first inside surface, and the second beam opposes the first beam. The first biasing member and the second biasing member are configured to move between a first position and a second position, moving the first beam and the second beam toward and away from the first inside surface and the second inside surface of the housing, respectively. The first position is a decompressed position and the second position is a compressed position.

19 Claims, 5 Drawing Sheets

SPRING LOADED NUT POCKET

FIELD

The present disclosure relates to a radiator tank, and, more specifically, to an attachment tab for a radiator tank.

BACKGROUND

This section provides background information related to the present disclosure which is not necessarily prior art.

Radiators are heat exchangers that are used to cool liquid flowing through the engine. Often, radiators include a core and at least one radiator tank, or plastic tank (p-tank). The p-tank includes attachment tabs such that different components (e.g., condensers, fan assemblies, charge air coolers, etc.) may be mounted to the p-tank. The attachment tabs often include molded-in nut pockets that receive a nut for attaching the various components. The nuts are inserted through the sides of the nut pockets and are often difficult to install into the nut pockets due to the tight fit necessary to prevent the nuts from falling out. The complexity in installing the nuts into the nut pockets increases installation time and effort.

SUMMARY

This section provides a general summary of the disclosure, and is not a comprehensive disclosure of its full scope or all of its features.

At least one example embodiment of an attachment tab according to the present disclosure is configured to house a nut and includes a housing, a first beam, and a second beam. The housing defines a cavity for receiving the nut. The first beam is attached to a first inside surface of said housing by a first biasing member. The second beam is attached to a second inside surface of the housing by a second biasing member. The second inside surface is opposite the first inside surface, and the second beam opposes the first beam. The first biasing member and the second biasing member are configured to move between a first position and a second position, moving the first beam and the second beam toward and away from the first inside surface and the second inside surface of the housing, respectively. The first position is a decompressed position and the second position is a compressed position.

In at least one example embodiment, the first beam and the second beam each include a triangular cross section with a vertical wall, a horizontal wall and a hypotenuse wall. The hypotenuse wall may be configured to contact the nut upon insertion into the housing.

In at least one example embodiment, a first projection may be on the first inside surface and a second projection may be on the second inside surface. The first projection may be opposite the second projection, and the first projection and the second projection may be configured to receive the nut therebetween.

In at least one example embodiment, the first projection and the second projection may be dome-shaped projections.

In at least one example embodiment, the first projection and the second projection may be disposed within the cavity and configured to be in a press-fit arrangement with the nut. The nut may deform the first projection and the second projection to fit therebetween.

In at least one example embodiment, the first projection and the second projection may be formed of an elastic material.

In at least one example embodiment, a shelf may be disposed within the cavity and may connect to the first inside surface and the second inside surface.

In at least one example embodiment, the shelf may be disposed adjacent the first projection and the second projection and may be configured to support the nut thereon.

In at least one example embodiment, the first biasing member and the second biasing member may be helical springs.

In at least one example embodiment, the housing may be a U-shaped housing having a front wall and a pair of opposing arms.

At least one example embodiment of a radiator assembly according to the present disclosure includes a core, an inlet tank, an outlet tank, and an attachment tab. The inlet tank may be disposed on a first end of the core and may be configured to receive a liquid from an engine. The outlet tank may be disposed on a second end of the core and may be configured to receive a liquid from the core. The second end of the core may be opposite the first end. The attachment tab may be disposed integral to the inlet tank or the outlet tank. The attachment tab may be configured to house a nut, and the attachment tab may be configured to fix an external component to the inlet tank or the outlet tank. The attachment tab may include a housing, a first beam, and a second beam. The housing may define a cavity for receiving the nut. The first beam may be attached to the first inside surface of the housing by a first biasing member. The second beam may be attached to a second inside surface of the housing by a second biasing member. The second inside surface may be opposite the first inside surface, and the second beam may oppose the first beam. The first biasing member and the second biasing member are configured to move between a first position and a second position, moving the first beam and the second beam toward and away from the first inside surface and the second inside surface of the housing, respectively. The first position may be a decompressed position and the second position may be a compressed position.

In at least one example embodiment, the first beam and the second beam may each include a triangular cross section with a vertical wall, a horizontal wall and a hypotenuse wall. The hypotenuse wall may be configured to contact the nut upon insertion into the housing.

In at least one example embodiment, a first projection may be on the first inside surface and a second projection may be on the second inside surface. The first projection may be opposite the second projection, and the first projection and the second projection may be configured to receive the nut therebetween.

In at least one example embodiment, the first projection and the second projection are dome-shaped projections.

In at least one example embodiment, the first projection and the second projection are disposed within the cavity and configured to be in a press-fit arrangement with the nut, the nut deforming the first projection and the second projection to fit therebetween.

In at least one example embodiment, the first projection and the second projection may be formed of an elastic material.

In at least one example embodiment, a shelf may be disposed within the cavity and connecting to the first inside surface and the second inside surface.

In at least one example embodiment, the shelf may be disposed adjacent the first projection and the second projection and may be configured to support the nut thereon.

In at least one example embodiment, the first biasing member and the second biasing member may be helical springs.

In at least one example embodiment, the housing may be a U-shaped housing having a front wall and a pair of opposing arms.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Radiators are heat exchangers used to transfer thermal energy (i.e., heat) away from an engine. To cool the engine, coolant passes through the engine block where it absorbs heat from the engine. The hot coolant is fed into an inlet tank of the radiator, is distributed across the radiator core through tubes to another tank on an opposite end of the radiator, and exits the radiator back into the engine. When the coolant passes through the radiator tubes a majority of the heat is transferred from the coolant to fins disposed between each row of tubes. The fins release the heat to the ambient air.

Radiators generally include a core and at least one plastic tank, or p-tank, mounted on the side of the core, among other components. Radiators include attachment tabs on the p-tanks to mount different components thereon (e.g., condensers, fan assemblies, charge air coolers, etc.). The attachment tabs include a nut pocket for receiving a nut used with a fastener to fix the component onto the attachment tab.

The nut pockets utilize a spring-loaded mechanism that allows a nut to be installed from a top of the nut pocket with ease. Each side of the nut pocket includes two springs that permit a wall on a distal end of the springs to retract towards a side of the nut pocket as the nut is installed. Once the nut is fully seated in the nut pocket, the springs return the wall back into position, effectively securing the nut inside the pocket.

Figure 1:
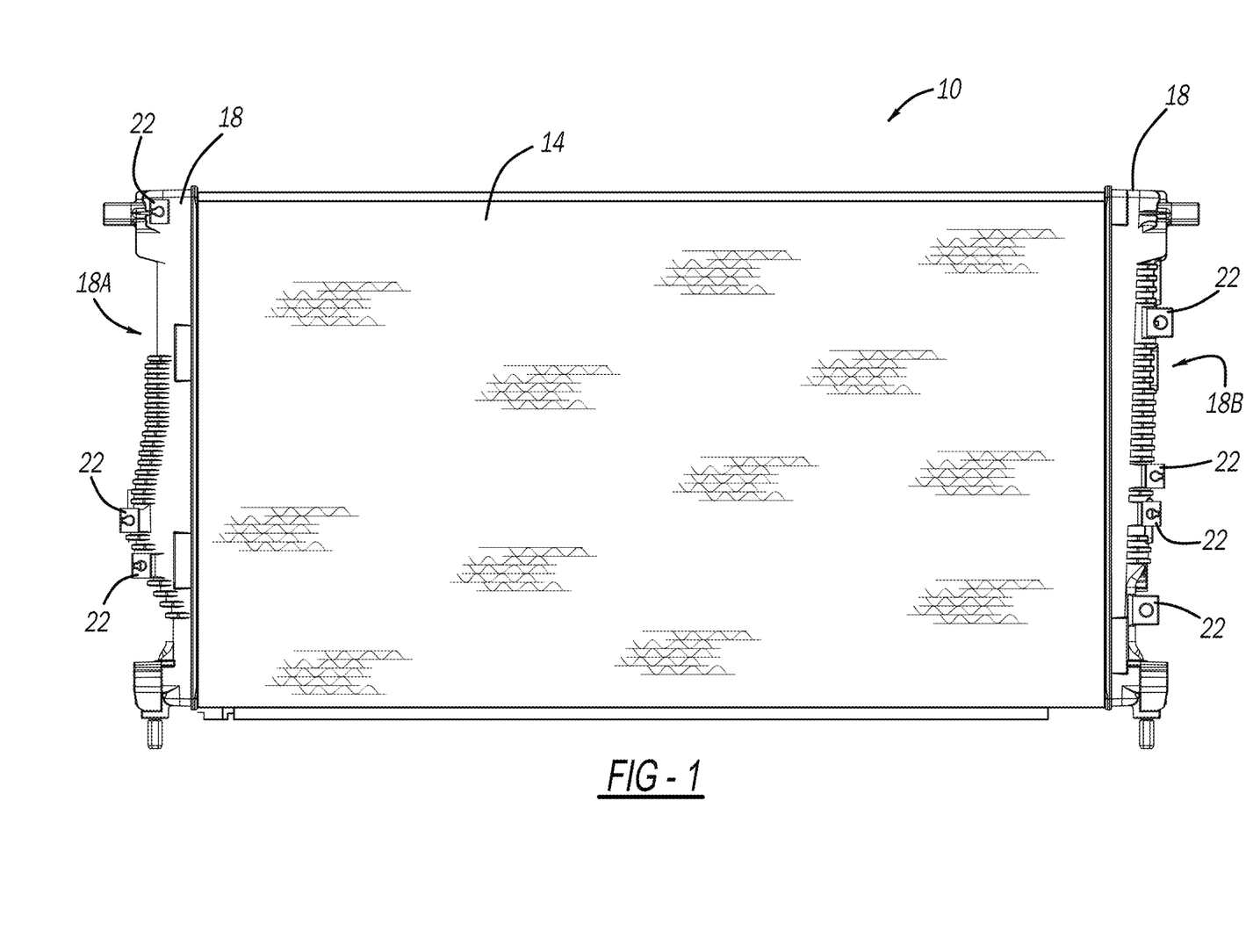
FIG. 1 is a front view of at least one example embodiment of a radiator according to the present disclosure.

Now referring to FIG. 1, at least one example embodiment of a radiator 10 according to the present disclosure is illustrated. The radiator 10 includes a core 14 and at least one end tank (e.g., inlet tank 18A and outlet tank 18B), plastic tank, or p-tank, 18. In at least one example embodiment, a pair of p-tanks 18 may be disposed on opposing ends of the core 14, sandwiching the core 14 therebetween.

The core 14 includes rows of tubes extending from one p-tank 18 (such as the inlet tank 18A) to a second p-tank 18 (such as the outlet tank 18B). The rows of tubes are separated by fins that are lodged between each row of tubes. During use, a liquid, such as coolant, travels from the inlet tank 18A to the outlet tank 18B through the tubes. Heat is transferred from the liquid to the atmosphere through the fins separating each row of tubes.

The p-tanks 18 on the ends of the core 14 hold coolant that is distributed into and out of the core 14. The p-tank 18 may also be known as the coolant reservoir, or overflow canister. As the engine heats up, the coolant inside the engine expands. Without the p-tank 18, the coolant would flow out of the overflow in the engine to be lost from the cooling system onto the street. Instead, the coolant flows into the p-tank 18 (specifically inlet tank 18A) and into the core 14 for cooling.

Figure 2:
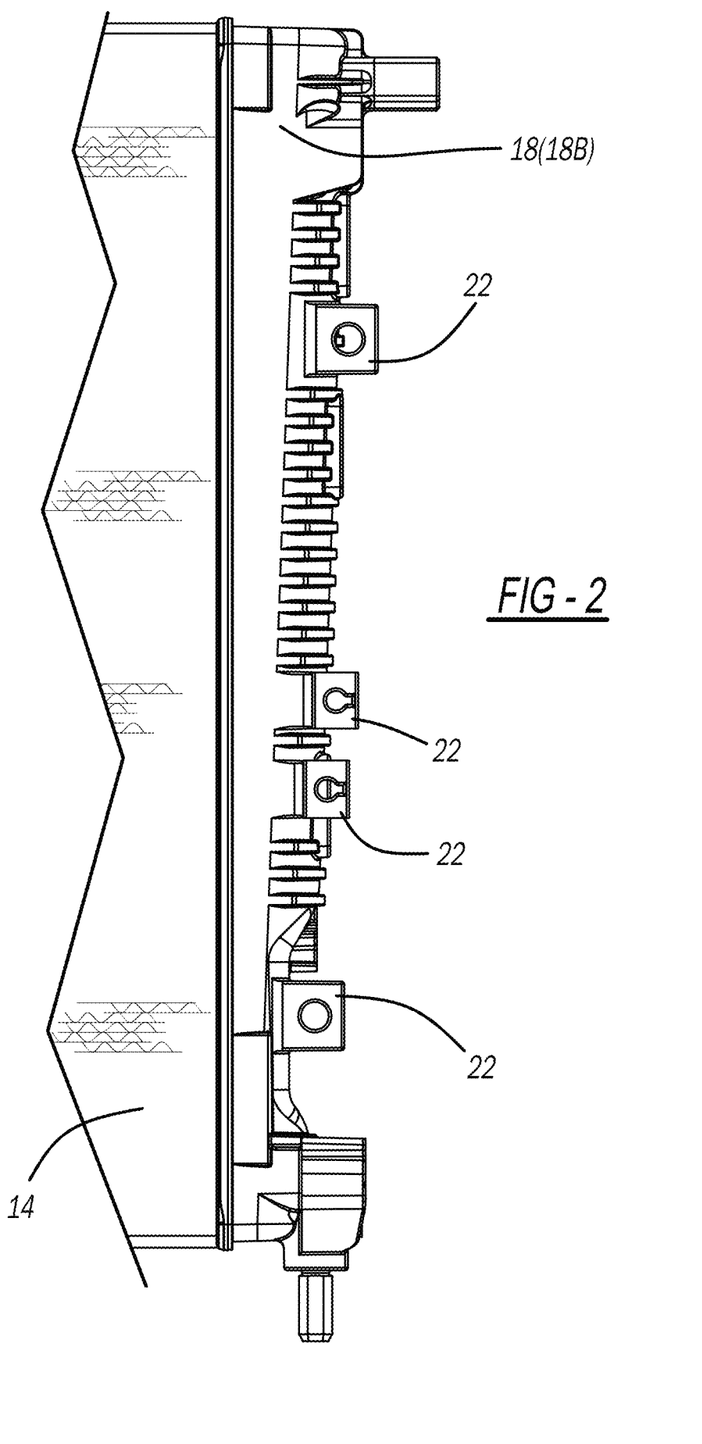
FIG. 2 is a front view of at least one example embodiment of a plastic tank, or p-tank, on the radiator in FIG. 1.

Referring additionally to FIG. 2, the p-tank 18 may be formed of a plastic, or other polymer, a metal, or another appropriate material. At least one example embodiment, the p-tank 18 may be formed by injection molding, metal rolling or stamping, etc., to create a single, monolithic part.

Each p-tank 18 may include attachment tabs 22 for attaching various components to the p-tank 18. For example, the attachment tabs 22 may be used to attach condensers, fan assemblies, charge air coolers, etc. The attachment tabs 22 may be formed during the formation of the p-tank 18, such that the attachment tabs 22 are a single, monolithic part with the p-tank 18.

Figure 3:
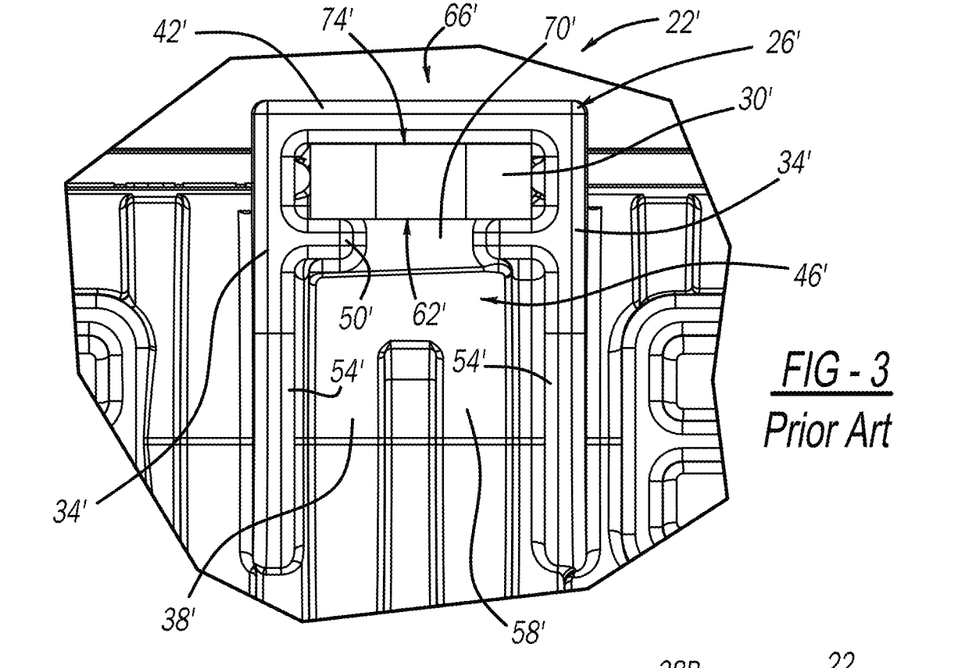
FIG. 3 is a side view of at least one example embodiment of a prior art attachment tab on the p-tank.

Now referring to FIG. 3, a side view of a prior art attachment tab 22' is illustrated. The attachment tab 22' includes a housing 26' in which a nut 30' is inserted. The housing 26' includes a pair of opposing sidewalls 34', a front wall 38', and a top wall 42'. The sidewalls 34', front wall 38', and top wall 42' define a cavity known as a nut pocket 46' therein. A shelf 50' is fixed on an inner face 54' of the opposing sidewalls 34' and an inner face 58' of the front wall 38' to support the nut 30'. The shelf 50' extends parallel to the top wall 42' and is spaced from the top wall 42' substantially a height of the nut 30', such that the nut 30' fits snugly within a nut insertion space 62' defined between the top wall 42' and the shelf 50'.

The top wall 42' and shelf 50' may each define apertures 66' and 70', respectively, for receiving a fastener therethrough. When assembled, a shaft of a fastener (not shown) may extend through an attachment portion of a separate component, the aperture 66' in the top wall 42', and aperture 74' in the nut 30', and the aperture 70' in the shelf 50', in that order. The shaft of the fastener (not shown) may include threads that mate with threads in the aperture 74' in the nut 30' to fix the fastener relative to the nut 30' and the housing 26'.

Because of the tight fit in the nut insertion space 62', the nuts 30' are difficult to install into the nut insertion space 62', causing increased manufacturing and installation times and a higher likelihood of incorrect assembly.

Figure 4:
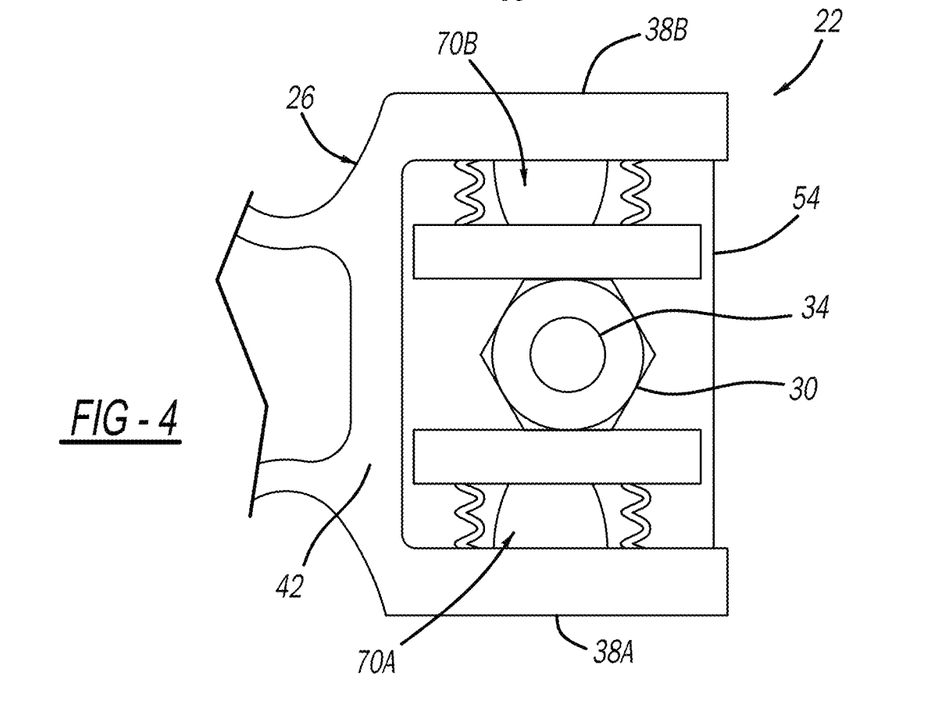
FIG. 4 is a top view of at least one example embodiment of an attachment tab having a spring loaded nut pocket according to the present disclosure in FIG. 2.

Now referring to FIG. 4, a top view of at least one example embodiment of the attachment tab 22 of the present disclosure is illustrated. In the at least one example embodiment, the attachment tab 22 includes a housing 26 in which a nut 30 is inserted. The nut 30 may be the same as the nut 30'. In at least one example embodiment, the nut 30 may be a hex nut, having a hexagonal shape with an aperture 34 extending through a center thereof. The aperture 34 may be threaded and configured to receive a fastener (not shown). The fastener may be any fastener (such as a screw, bolt, pin, etc.) configured to fix a separate component to the attachment tab 22.

The housing 26 includes a pair of opposing arms, or sidewalls, 38 and a front wall 42 connecting the opposing arms 38. In at least one example embodiment, the front wall 42 and opposing arms 38 form a U-shape that attaches to the p-tank 18 housing at a base 46 of the front wall 42 and a base 50 of each of the opposing arms 38. The front wall 42 and opposing arms 38 define a cavity, or a nut pocket, 52 for receiving the nut 30 therein.

In at least one example embodiment, a ledge, or shelf, 54 connects the front wall 42 and opposing arms 38 and extends orthogonal to an inside surface 58, 62, 66 of each of the front wall 42 and opposing arms 38, respectively. In use, the nut 30 rests on the ledge 54 in the housing 26. In at least one example embodiment, the ledge 54 may define an aperture (not shown) that aligns with the aperture 34 in the nut 30 and is configured to receive the fastener (not shown).

In at least one example embodiment, a projection 70A may project from an inside surface 62 of a first arm 38A of the opposing arms 38 and a projection 70B (collectively, projections 70 or opposing projections 70) may project from an inside surface 66 of a second arm 38B of the opposing arms 38. The projections 70A and 70B may be rounded projections having a dome shape that extends from the inside surface 62, 66 of the opposing arms 38. The projections 70A and 70B may further be opposing projections that are aligned on opposing sides of the ledge 54 and a peak 74A, 74B of each dome of the projections 70A, 70B, respectively, may point toward each other.

In at least one example embodiment, each of the projections 70 may be formed of a polymer or elastomer (for example, rubber, plastic, etc.). For example only, the projection 70 may be deformable. When the nut 30 is inserted, the nut 30 may press against the peaks 74A and 74B and deform the projections 70A and 70B, creating a tight fit, press-fit, or interference fit between the nut 30 and the housing 26, and between the nut 30 and the projections 70A, 70B. The fit between the nut 30 and the projections 70A, 70B retains the nut 30 in position in the housing 26.

In at least one example embodiment, a pair of opposing beams 78 (78A, 78B) may be fixed to the inside surfaces 62, 66 of the opposing arms 38. For example, a first beam 78A may be fixed to the inside surface 62 of the arm 38A by a pair of biasing members (for example, springs such as helical springs), 82. Each of the biasing members 82 may be fixed to the first beam 78A on a first end 86 and may be fixed to the inside surface 62 on a second end 90. A second beam 78B may be fixed to the inside surface 66 of the arm 38B by a pair of biasing members (for example, springs such as helical springs) 94. Each of the biasing members 94 may be fixed to the second beam 78B on a first end 98 and may be fixed to the inside surface 66 on a second end 102.

Figure 5:
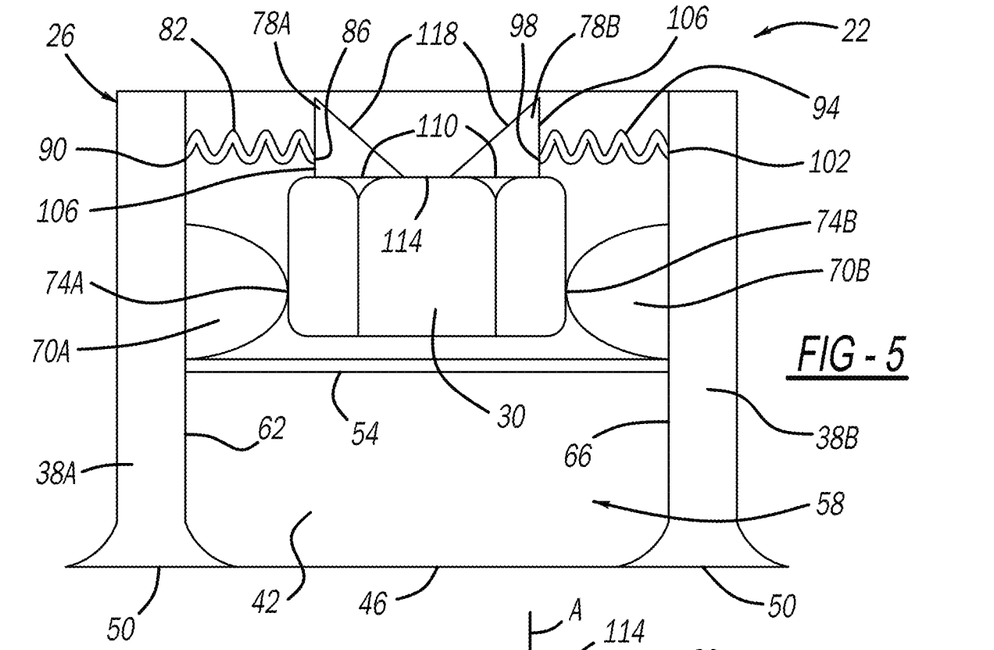
FIG. 5 is a side view of the assembly tab having the spring loaded nut pocket in FIG. 4.

In at least one example embodiment, each of the pair of opposing beams 78 may be an elongate triangular beam, having a right triangle-shaped cross-section. The first end 86, 98 of the biasing member 82, 94 may be fixed to a vertical wall 106 of the opposing beams 78, and a horizontal wall 110 of the opposing beam 78 may be parallel to the ledge 54. When the nut 30 is fixed within the housing 26, the horizontal wall 110 may contact or abut a top surface 114 of the nut 30. A hypotenuse wall 118 of the opposing beams 78 may connect the vertical wall 106 and the horizontal wall 110 and may be configured to contact the nut 30 when the nut 30 is inserted in the housing 26.

In at least one example embodiment, the opposing beams 78 may be formed of a polymer, an elastomer, a ceramic, a metal, or any other suitable material. In at least one example embodiment, the opposing beams may be formed by injection molding, blow molding, another molding process, metal rolling, metal stamping, casting, or any other suitable process for the material selected.

Figure 6:
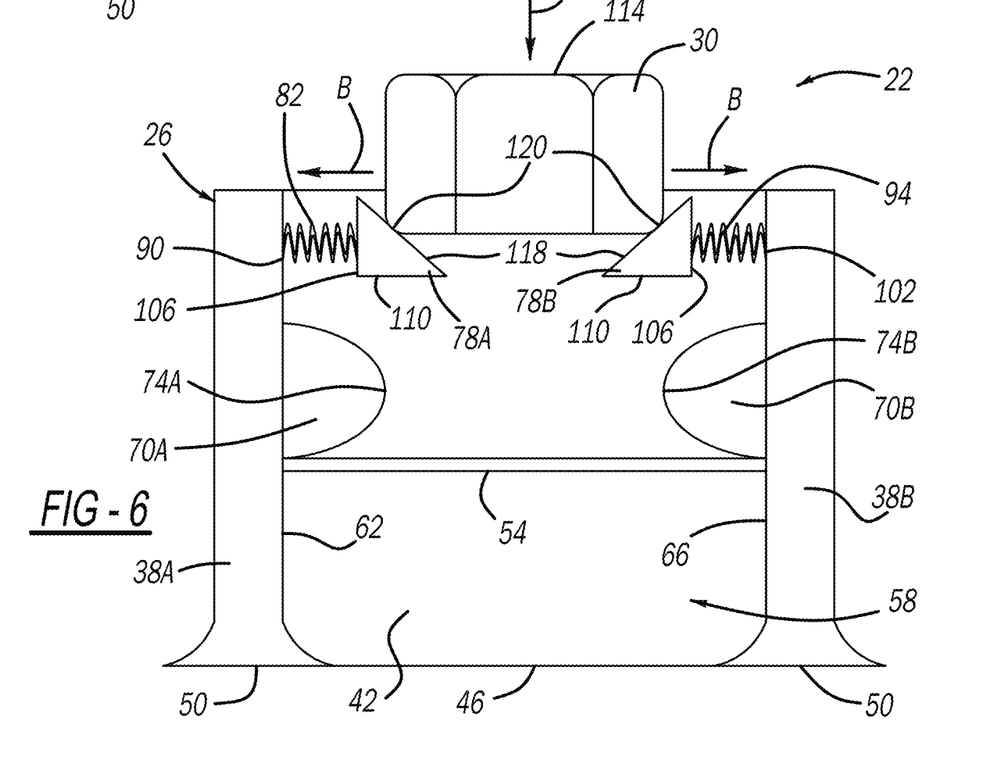
FIG. 6 is a side view illustrating a first step of a nut being inserted into the spring loaded nut pocket in FIG. 5.
Figure 7:
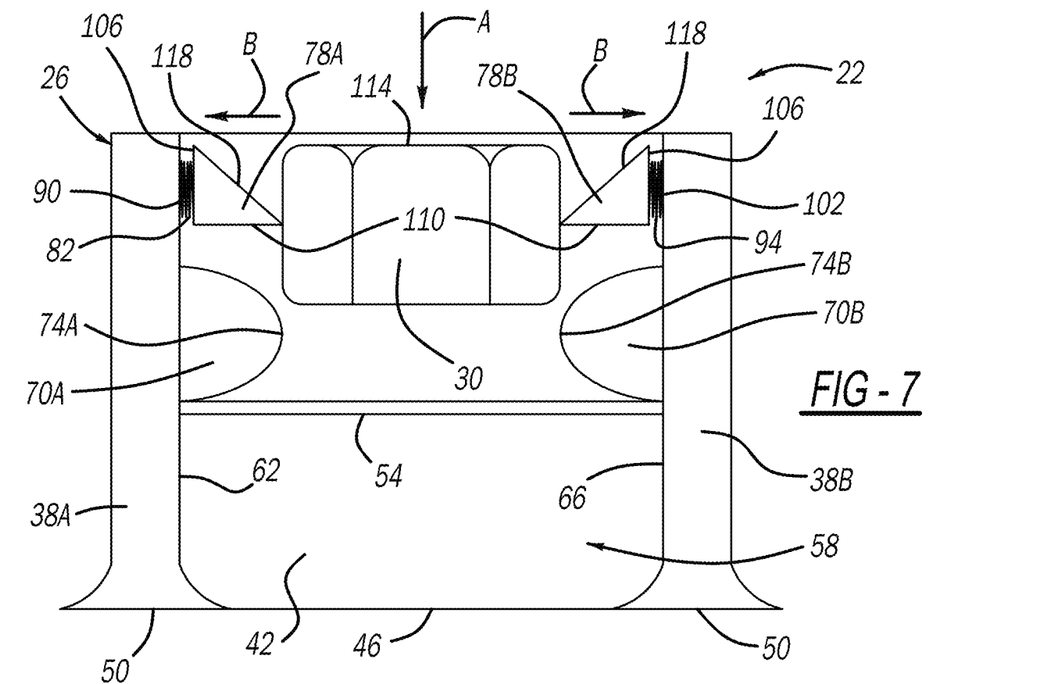
FIG. 7 is a side view illustrating a second step of the nut being inserted into the spring loaded nut pocket in FIG. 5.
Figure 8:
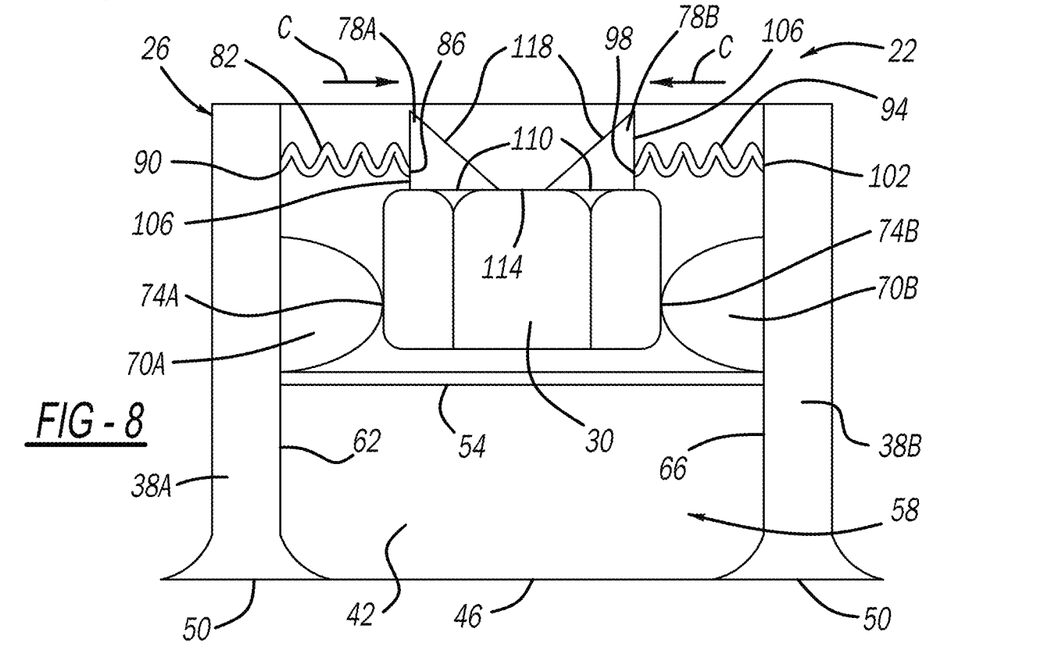
FIG. 8 is a side view illustrating the third step of the nut being inserted into the spring loaded nut pocket in FIG. 5.

Now referring to FIGS. 6-8, a process for inserting the nut 30 into the housing 26 is illustrated. As shown in FIG. 6, the nut 30 is aligned between the opposing arms 38 and with the hypotenuse walls 118 of the opposing beams 78. The opposing beams 78 are in a first position, with the biasing members 82, 94 completely decompressed, biasing the opposing beams 78 inward, towards each other. The nut 30 is moved vertically toward the ledge 54 until the nut 30 is brought into contact with the hypotenuse walls 118 simultaneously. For example, a bottom edge 120 of the nut 30 may be brought into contact with the hypotenuse walls 118. As the nut 30 is pressed vertically into the hypotenuse walls 118 of the opposing beams 78, the biasing members 82, 94 begin to compress, separating the opposing beams 78. As the opposing beams 78 separate, the beams 78 move substantially horizontally in a direction toward the respective inside surfaces 62, 66 of the opposing arms 38. When the opposing beams 78 separate, the bottom edge 120 of the nut 30 slides along the hypotenuse walls 118 of the opposing beams 78, applying additional pressure on the hypotenuse walls 118 and further separating the opposing beams 78. In an example embodiment, the movement of the nut 30 is shown by arrow A, and the movement of the opposing beams 78 is shown by arrow B.

Referring to FIG. 7, as the nut 30 is moved vertically toward the ledge 54, the biasing members 82, 94 fully compress to a second position when the nut 30 fits entirely between the opposing beams 78. When the biasing members 82, 94 are entirely compressed, the opposing beams 78 are in a completely retracted position.

Referring to FIG. 8, as the nut 30 continues vertical movement and approaches the ledge 54, the top surface 114 moves past the opposing beams 78, and the biasing members 82, 94 decompress, moving the opposing beams 78 back to the first position. For example only, the biasing members 82, 94 move the opposing beams 78 in the direction of arrow C. When the nut 30 surpasses the opposing beams 78, the nut 30 engages the peaks 74 of the projections 70. The nut 30 is pressed into position between the projections 70, deforming the peaks 74 and creating a press-fit (or interference fit) arrangement between the nut 30 and the projections 70. When the nut 30 is fully seated on the ledge 54, the nut 30 is in the press-fit (or interference fit) arrangement with the projections 70, and the opposing beams 78 rest on the top surface 114 of the nut 30. A gap 122 between the opposing beams 78 aligns with the aperture 34 in the nut 30 and the aperture (not shown) in the ledge 54 to receive the fastener (not shown) therein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An attachment tab configured to house a nut, the attachment tab comprising:
   a housing defining a cavity for receiving the nut; and
   a first beam attached to a first inside surface of said housing by a first biasing member; and
   a second beam attached to a second inside surface of said housing by a second biasing member, said second inside surface being opposite said first inside surface, and said second beam opposing said first beam,
   wherein, the first biasing member and the second biasing member are configured to move between a first position and a second position, moving the first beam and the second beam toward and away from the first inside surface and the second inside surface of the housing, respectively, the first position being a decompressed position and the second position being a compressed position, and
   wherein the housing is a U-shaped housing having a front wall and a pair of opposing arms.

2. The attachment tab of claim 1, wherein the first beam and the second beam each include a triangular cross section with a vertical wall, a horizontal wall and a hypotenuse wall, the hypotenuse wall being configured to contact the nut upon insertion into the housing.

3. The attachment tab of claim 1, further comprising a first projection on the first inside surface and a second projection on the second inside surface, the first projection being opposite the second projection, and the first projection and the second projection being configured to receive the nut therebetween.

4. The attachment tab of claim 3, wherein the first projection and the second projection are dome-shaped projections.

5. The attachment tab of claim 3, wherein the first projection and the second projection are disposed within the cavity and configured to be in a press-fit arrangement with the nut, the nut deforming the first projection and the second projection to fit therebetween.

6. The attachment tab of claim 3, wherein the first projection and the second projection are formed of an elastic material.

7. The attachment tab of claim 3, further comprising a shelf disposed within the cavity and connecting to the first inside surface and the second inside surface.

8. The attachment tab of claim 7, wherein the shelf is disposed adjacent the first projection and the second projection and is configured to support the nut thereon.

9. The attachment tab of claim 1, wherein the first biasing member and the second biasing member are helical springs.

10. A radiator assembly comprising:
    a core;
    an inlet tank being disposed on a first end of the core and configured to receive a liquid from an engine;
    an outlet tank disposed on a second end of the core and configured to receive a liquid from the core, the second end of the core being opposite the first end; and
    an attachment tab disposed integral to the inlet tank or the outlet tank, the attachment tab being configured to house a nut, and the attachment tab being configured to fix an external component to the inlet tank or the outlet tank, wherein the attachment tab includes a housing defining a cavity for receiving the nut, a first beam attached to a first inside surface of said housing by a first biasing member, and a second beam attached to a second inside surface of said housing by a second biasing member, said second inside surface being opposite said first inside surface, and said second beam opposing said first beam, wherein, the first biasing member and the second biasing member are configured to move between a first position and a second position, moving the first beam and the second beam toward and away from the first inside surface and the second inside surface of the housing, respectively, the first position being a decompressed position and the second position being a compressed position.

11. The radiator assembly of claim 10, wherein the first beam and the second beam each include a triangular cross section with a vertical wall, a horizontal wall and a hypotenuse wall, the hypotenuse wall being configured to contact the nut upon insertion into the housing.

12. The attachment tab of claim 10, further comprising a first projection on the first inside surface and a second projection on the second inside surface, the first projection being opposite the second projection, and the first projection and the second projection being configured to receive the nut therebetween.

13. The attachment tab of claim 12, wherein the first projection and the second projection are dome-shaped projections.

14. The attachment tab of claim 12, wherein the first projection and the second projection are disposed within the cavity and configured to be in a press-fit arrangement with the nut, the nut deforming the first projection and the second projection to fit therebetween.

15. The attachment tab of claim 12, wherein the first projection and the second projection are formed of an elastic material.

16. The attachment tab of claim 12, further comprising a shelf disposed within the cavity and connecting to the first inside surface and the second inside surface.

17. The attachment tab of claim 16, wherein the shelf is disposed adjacent the first projection and the second projection and is configured to support the nut thereon.

18. The attachment tab of claim 10, wherein the first biasing member and the second biasing member are helical springs.

19. The attachment tab of claim 10, wherein the housing is a U-shaped housing having a front wall and a pair of opposing arms.

* * * * *